Sept. 18, 1945.  H. F. HANSON  2,384,996
DRIVING MECHANISM
Filed May 28, 1943  2 Sheets-Sheet 1
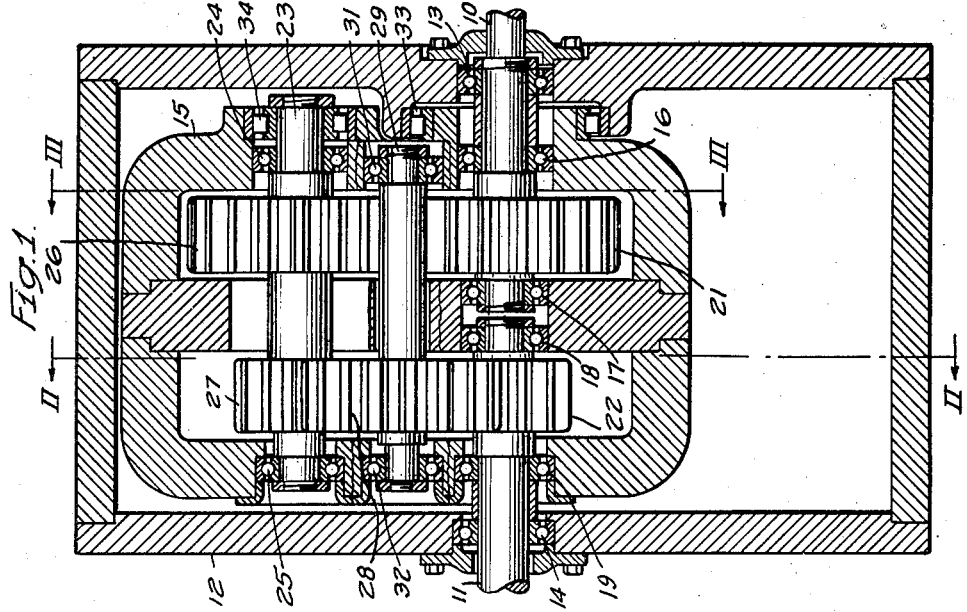
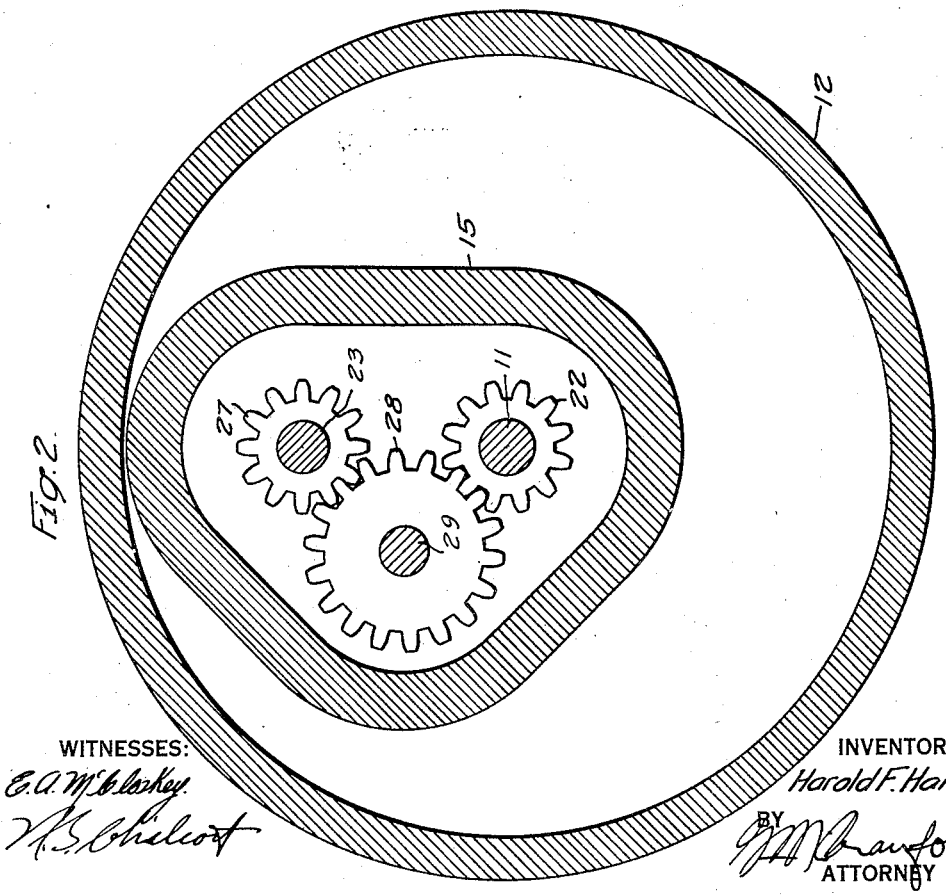
WITNESSES:
INVENTOR
Harold F. Hanson.
BY
ATTORNEY Sept. 18, 1945.    H. F. HANSON    2,384,996
DRIVING MECHANISM
Filed May 28, 1943    2 Sheets-Sheet 2
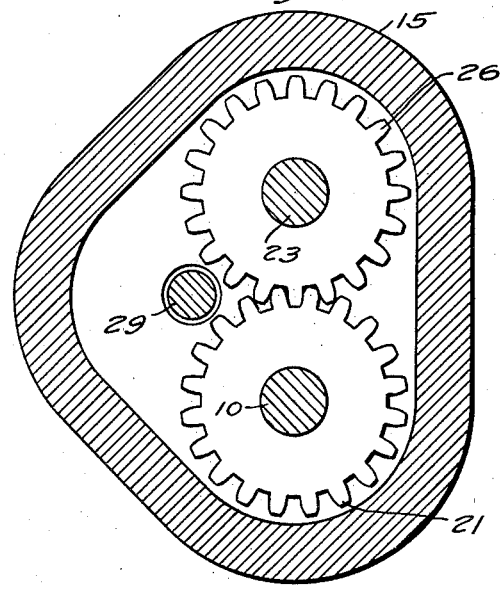
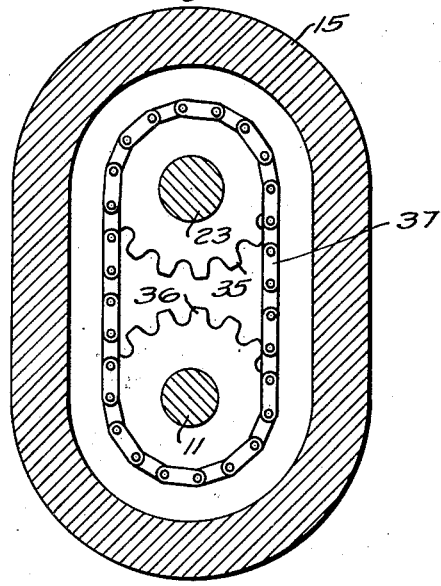
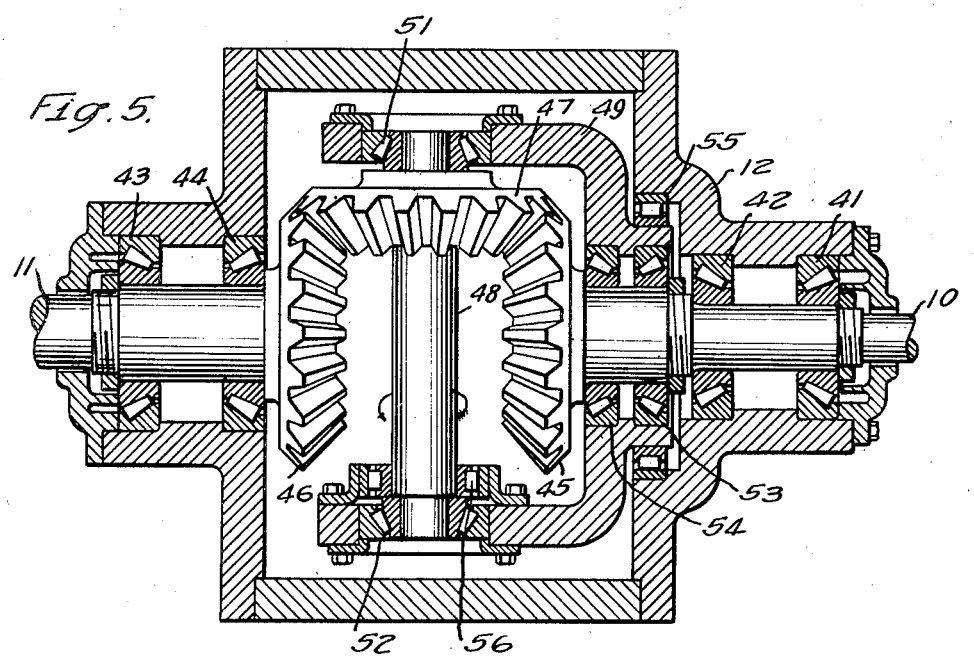
INVENTOR
Harold F. Hanson.
BY
ATTORNEY Patented Sept. 18, 1945

2,384,996

UNITED STATES PATENT OFFICE 2,384,996

DRIVING MECHANISM

Harold F. Hanson, Wilkinsburg, Pa., assignor to Westinghouse Electric Corporation, East Pittsburgh, Pa., a corporation of Pennsylvania Application May 28, 1943, Serial No. 488,831

6 Claims. (Cl. 74—367)

My invention relates, generally, to driving mechanisms and, more particularly, to those of the unidirectional type wherein the driven shaft always rotates in the same direction regardless of the direction of rotation of the driving shaft.

One field of application for unidirectional drives is on railway car lighting and air-conditioning generators which are driven by the car axles. At the present time rather complicated brush shifting and control devices are utilized to provide for a change in the direction of operation of the railway cars.

An object of my invention, generally stated, is to provide a unidirectional drive which shall be simple and efficient in operation and which may be economically manufactured and installed.

A more specific object of my invention is to provide a totally-enclosed unidirectional drive of the gear type.

Another object of my invention is to provide a unidirectional drive of the gear type in which the gears are constantly in mesh.

A further object of my invention is to provide a unidirectional drive in which no bearing operates faster than the driving or the driven shaft.

Other objects of my invention will be explained fully hereinafter or will be apparent to those skilled in the art.

In accordance with my invention, a plurality of intermeshing gears, of either the spur or the bevel type, and overrunning clutches are so disposed in a rotatable yoke that a driven shaft always rotates in the same direction regardless of the direction of rotation of the driving shaft.

For a fuller understanding of the nature and objects of the invention, reference may be had to the following detailed description, taken in conjunction with the accompanying drawings, in which:

Figure 1 is a sectional view of a unidirectional drive mechanism embodying my invention;

Fig. 2 is a view, in section, taken along the line II—II of Fig. 1;

Fig. 3 is a view in section, taken along the line III—III of Fig. 1;

Fig. 4 is a sectional view showing a modified arrangement of part of the gears shown in Figs. 1 and 2; and Fig. 5 is a sectional view of a modification of the invention.

Referring to the drawings and, more particularly, to Figures 1, 2 and 3, the structure shown therein comprises a driving shaft 10 and a driven shaft 11 which are rotatably mounted in a housing 12 on bearings 13 and 14, respectively. A yoke 15 is rotatably mounted on the shafts 10 and 11 by means of bearings 16, 17, 18 and 19, the bearings 16 and 17 being disposed on the shaft 10 and the bearings 18 and 19 being disposed on the shaft 11.

A spur gear 21 is secured to the shaft 10 and a similar gear 22 is secured to the shaft 11. An intermediate gear shaft 23 is rotatably mounted in the yoke 15 by means of bearings 24 and 25. A gear 26, which intermeshes with the gear 21, is secured to the intermediate shaft 23. A gear 27 is also secured to the intermediate shaft 23 and is interconnected with the gear 22 by means of an idler gear 28. The idler gear 28 is secured to a shaft 29 which is rotatably mounted in the yoke 15 by means of bearings 31 and 32.

In order that the driven shaft 11 will rotate in only one direction irrespective of the direction of rotation of the driving shaft 10, an overrunning clutch or brake 33 is provided for controlling the direction of rotation of the yoke 15 in the housing 12. A similar overrunning clutch or brake 34 is also provided for controlling the direction of rotation of the intermediate gear shaft 23 in the yoke 15. The overrunning clutches 33 and 34 may be of a type well known in the automotive art. In the present structure the clutch 33 is so constructed that the yoke 15 can rotate only in a clockwise direction, which is the direction of rotation of the driven shaft 11. Likewise, the clutch 34 is so constructed that the intermediate gear shaft 23 can rotate only in a clockwise direction. It will be understood that if counterclockwise rotation of the driven shaft 11 is desired, the clutches 33 and 34 may be so constructed as to secure counterclockwise rotation of the members controlled by these clutches.

The structure shown in the present application operates as follows: For clockwise rotation of the driving shaft 10 the overrunning clutch 33 turns freely, while the overrunning clutch 34 locks the intermediate gear shaft 23 to the yoke 15. This causes the yoke 15 and all the gears to rotate as a unit, thereby driving the driven shaft 11 in a clockwise direction.

For counterclockwise rotation of the driving shaft 10, the overrunning clutch 33 locks the yoke 15 to the housing 12, while the overrunning clutch 34 turns freely in the yoke 15. This causes the driven shaft 11 to be rotated in a clockwise direction through the gears 21, 26, 27, 28, and 22, the shafts for which rotate in their respective bearings. In this manner the shaft 11 is driven in only one direction irrespective of the direction of rotation of the driving shaft 10.

As illustrated in Fig. 4 the mechanism may be simplified by omitting the idler gear 28, its shaft 29, and the bearings required for the idler gear shaft. Sprocket wheels 35 and 36 are provided in place of the gear wheels 27 and 22, respectively, and these sprocket wheels are connected by means of a chain 37. Otherwise, the modified structure is similar to that shown in Figs. 1, 2 and 3.

A further modification of the invention is illustrated in Fig. 5 in which like parts are designated by the same reference characters as in Figs. 1 to 4, inclusive. The driving shaft 10 is rotatably mounted in the housing 12 on bearings 41 and 42. The driven shaft 11 is rotatably mounted in the housing 12 on bearings 43 and 44.

A bevel gear 45 is secured to the shaft 10 and a similar bevel gear 46 is secured to the shaft 11. An intermediate gear 47 is secured to a shaft 48 which is rotatably mounted in a yoke 49 by means of bearings 51 and 52. The yoke 49 is rotatably mounted on the shaft 10 by means of bearings 53 and 54.

In order to control the direction of rotation of the yoke 49 and the intermediate gear shaft 48, an overrunning clutch 55 is disposed between the yoke 49 and the housing 12 and a similar overrunning clutch 56 is disposed between the intermediate gear shaft 48 and the yoke 49. The overrunning clutch 55 is so constructed that the yoke 15 can rotate only in a clockwise direction which is the direction of rotation of the driven shaft 11. The overrunning clutch 56 is so constructed that the intermediate gear shaft 48 can rotate only in the direction indicated by the arrow. As explained hereinbefore, the clutches 55 and 56 may be so constructed that opposite directions of rotation of the yoke, and the intermediate gear shaft are obtained, thereby securing counterclockwise rotation of the driven shaft.

The structure shown in Fig. 5 operates as follows: For clockwise rotation of the driving shaft 10 the overrunning clutch 55 turns freely, while the overrunning clutch 56 locks the intermediate gear shaft 48 and the yoke 49 together. This causes the yoke 49 and the three bevel gears to rotate as a unit, thereby driving the shaft 11 in a clockwise direction.

For counterclockwise rotation of the driving shaft 10 the overrunning clutch 55 locks the yoke 49 to the housing 12 while the overrunning clutch 56 turns freely. This brings the bevel gears into action thereby causing the driven shaft to rotate clockwise.

It will be noted that in the present structure the driving and the driven gears are of the same diameters, therefore, no bearing is required to operate faster than the driving or the driven shaft. Other drives of the present type, with which I am familiar, require certain of the bearings to operate at double speeds, thereby making an almost impossible bearing application for railway service.

A further advantage of the present structure is that all of the bearings and gears are totally enclosed, thereby permitting proper lubrication of these members. Furthermore, it is apparent that a portion of the structure herein illustrated can be built into other equipment such as a generator housing, thereby further simplifying the structure.

As explained hereinbefore, the unidirectional drive herein described and illustrated may be utilized with railway car lighting and air-conditioning generators. It may also be utilized in other applications where the unidirectional feature is desired.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A unidirectional drive comprising, a driving shaft, a driven shaft, a gear secured to the driving shaft, an intermediate gear cooperating with said gear, a rotatable shaft to which said intermediate gear is secured, a rotatable yoke for supporting said intermediate gear shaft parallel to the driving and driven shafts, means for connecting the intermediate gear shaft to the driven shaft, means for controlling the direction of rotation of said yoke, and additional means for controlling the direction of rotation of said intermediate gear shaft whereby the driven shaft always rotates in the same direction irrespective of the direction of rotation of the driving shaft.

2. A unidirectional drive comprising, a driving shaft, a driven shaft, a gear secured to each of said shafts, an intermediate gear cooperating with the gear on the driving shaft, a rotatable shaft to which said intermediate gear is secured, a rotatable yoke for supporting said intermediate gear shaft parallel to the driving and driven shafts, gear means for connecting the intermediate gear shaft to the gear on the driven shaft, a brake for controlling the direction of rotation of said yoke and an additional brake for controlling the direction of rotation of said intermediate gear shaft, whereby the driven shaft always rotates in the same direction irrespective of the direction of rotation of the driving shaft.

3. A unidirectional drive comprising, a driving shaft, a driven shaft, a gear secured to each of said shafts, an intermediate gear cooperating with the gear on the driving shaft, a rotatable shaft to which said intermediate gear is secured, a rotatable yoke for supporting said intermediate gear shaft parallel to the driving and driven shafts, means for connecting the intermediate gear shaft to the driven shaft, said yoke being free to rotate about said driving shaft in one direction only, and said intermediate gear shaft being free to rotate in said yoke in one direction only, whereby the driven shaft always rotates in the same direction irrespective of the direction of rotation of the driving shaft.

4. A unidirectional drive comprising, a driving shaft, a driven shaft, a gear secured to the driving shaft, an intermediate gear cooperating with said gear, a rotatable shaft to which said intermediate gear is secured, a rotatable yoke for supporting said intermediate gear shaft, means for connecting the intermediate gear shaft to the driven shaft, said yoke being free to rotate about said driving shaft in one direction only, said intermediate gear shaft being free to rotate in said yoke in one direction only, whereby the driven shaft always rotates in the same direction irrespective of the direction of rotation of the driving shaft, and a housing enclosing said gears and said yoke.

5. A unidirectional drive comprising, a driving shaft, a driven shaft, a gear secured to each of said shafts, an intermediate gear cooperating with the gear on the driving shaft, a rotatable shaft to which said intermediate gear is secured, a rotatable yoke for supporting said intermediate gear shaft, means for connecting the intermediate gear shaft to the driven shaft, said yoke being free to rotate about said driving shaft in one direction only, said intermediate gear shaft being free to rotate in said yoke in one direction only, whereby the driven shaft always rotates in the same direction irrespective of the direction of rotation of the driving shaft, and a housing enclosing said gears and said yoke and supporting said driving and said driven shafts.

6. A unidirectional drive comprising, a driving shaft, a driven shaft, a gear secured to each of said shafts, an intermediate gear intermeshing with the gear on the driving shaft, a rotatable shaft for said intermediate gear, a rotatable yoke for supporting said intermediate gear shaft, means for connecting said intermediate gear shaft to the gear on the driven shaft, said yoke being free to rotate about said driving shaft in one direction only, and said intermediate gear shaft being free to rotate in said yoke in one direction only, whereby the driven shaft always rotates in the same direction irrespective of the direction of rotation of the driving shaft.

HAROLD F. HANSON.